(12) United States Patent
Bordegnoni et al.

(10) Patent No.: US 10,456,931 B2
(45) Date of Patent: Oct. 29, 2019

(54) MULTI-AXIS INDUSTRIAL SCARA ROBOT

(71) Applicant: Comau S.p.A., Grugliasco (Turin) (IT)

(72) Inventors: Stefano Bordegnoni, Grugliasco (IT);
Francesco Ciniello, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 216 days.

(21) Appl. No.: 15/386,414

(22) Filed: Dec. 21, 2016

(65) Prior Publication Data

US 2017/0182669 A1    Jun. 29, 2017

(30) Foreign Application Priority Data

Dec. 23, 2015    (IT) .................. 102015000087109

(51) Int. Cl.
| | |
|---|---|
| *B25J 19/00* | (2006.01) |
| *B25J 9/04* | (2006.01) |
| *B25J 9/12* | (2006.01) |
| *B25J 18/04* | (2006.01) |
| *B25J 9/00* | (2006.01) |

(52) U.S. Cl.
CPC ......... *B25J 19/0029* (2013.01); *B25J 9/0009* (2013.01); *B25J 9/044* (2013.01); *B25J 9/12* (2013.01); *B25J 18/04* (2013.01); *B25J 19/0075* (2013.01)

(58) Field of Classification Search
CPC .. B25J 19/0029; B25J 9/0009; B25J 19/0075; B25J 9/12; B25J 9/044; B25J 18/04
See application file for complete search history.

(56) References Cited

U.S. PATENT DOCUMENTS

2015/0273702 A1    10/2015 Ting et al.

FOREIGN PATENT DOCUMENTS

| JP | 01183384 A | * | 7/1989 |
|---|---|---|---|
| JP | 2013022715 A | | 2/2013 |

* cited by examiner

*Primary Examiner* — Victor L MacArthur
(74) *Attorney, Agent, or Firm* — Young Basile Hanlon & MacFarlane, P.C.

(57) ABSTRACT

Described herein is a multi-axis industrial robot, in particular of a SCARA type, wherein the arm bearing the operating unit comprises a base body and a covering body, which constitute a hermetically closed housing that contains the actuation assembly of said unit.
The robot is characterized in that the arm further comprises an internal intermediate body via which the covering body can be fixed to the base body without any need to envisage direct fixing between these two bodies.

10 Claims, 8 Drawing Sheets

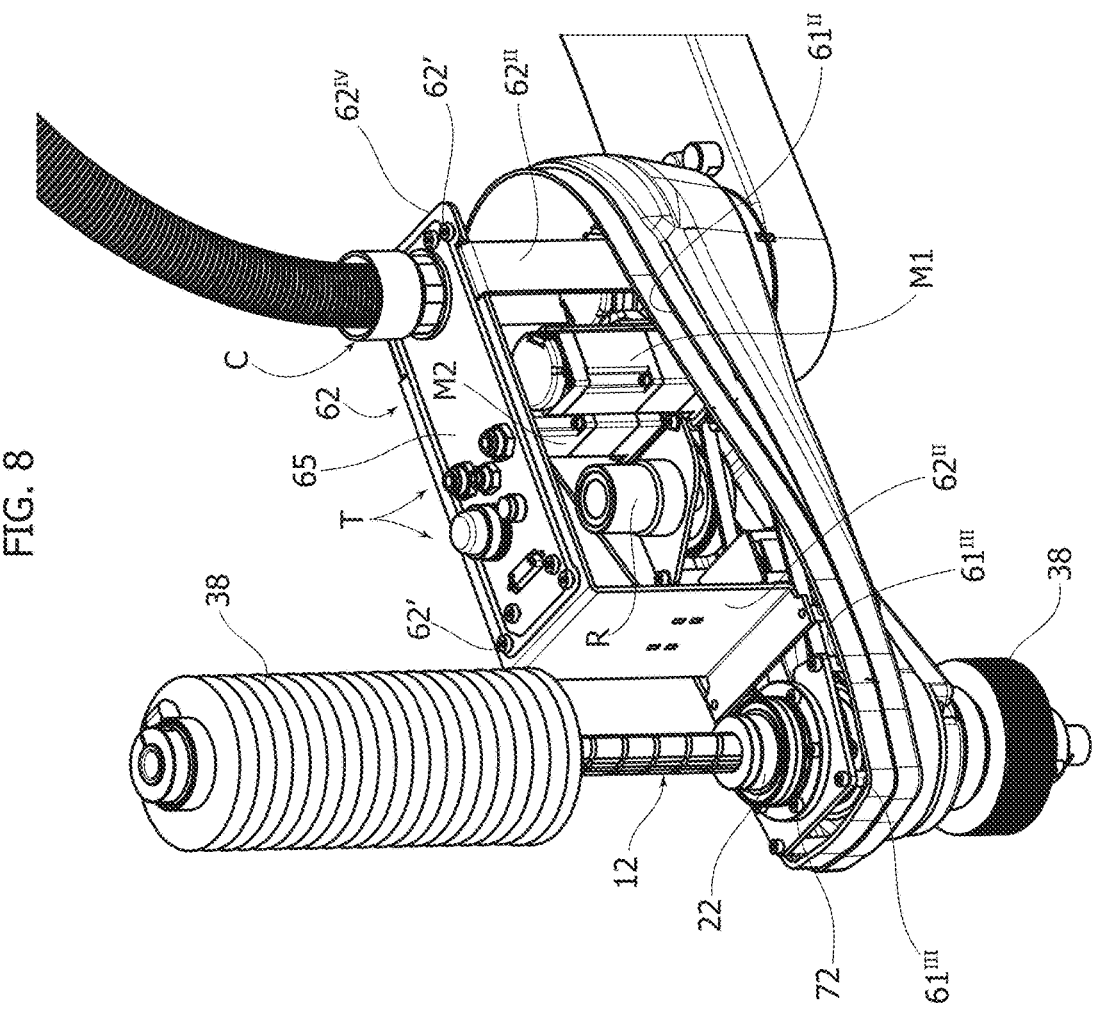

ns. In particular, the full integration of the intermediate body 62

MULTI-AXIS INDUSTRIAL SCARA ROBOT

TECHNICAL FIELD

The present invention relates to a multi-axis industrial robot, in particular of a SCARA type, and specifically to the distal arm of the robot on which the operating unit is carried.

BACKGROUND

As is known in the art, in a robot of a SCARA type the operating unit of the robot is carried by a shaft, which is mounted on the distal arm of the robot so that it can rotate about its own axis and at the same time is mobile in translation along this axis. The actuation assembly for driving the shaft is contained within the robot arm in question. To facilitate installation of the actuation assembly on the arm, the latter is usually constituted by a base body, fixed on which is the actuation assembly, and by a covering body, which is fixed on the base body and together with the latter comes to constitute the outer housing within which the actuation assembly is enclosed.

In some sectors of use of the above type of robots, for example in the field of the production of foodstuff products or of sanitary articles, it is important to guarantee that the working area of the robot is not contaminated by the robot itself, for example on account of grease, oil, etc., which could be released and dispersed by the robot. On the other hand, in certain applications, the robot may, instead, be exposed to the presence of liquids so that it is necessary to prevent any possible penetration of these liquids within the parts of the robot.

In the art, there have already been produced robots of a SCARA type that are appropriately prearranged so that they can be used in the applications referred to above. These robots have, in particular, the aforesaid distal arm, bearing the operating unit, that is hermetically closed with respect to the external environment and is equipped with bellows associated to the above mobile shaft in order to prevent any passage of air between the shaft and the housing of the arm. Hermetic closing on the one hand protects the electrical and mechanical members arranged within the arm and on the other hand prevents any material that might contaminate the working area from coming out of the robot.

SUMMARY

The object of the present invention is to provide a multi-axis robot, in particular of a SCARA type, that will have an improved structure as compared to the known solutions, above all with reference to its distal arm, and in particular in terms of constructional simplification, ease of installation, and level of tightness.

The object referred to is achieved via a robot having the characteristics referred to in Claim 1.

The claims form an integral part of the technical teaching provided herein in relation to the invention.

Further characteristics and advantages of the invention will emerge clearly from the ensuing description with reference to the annexed drawings, which are provided purely by way of non-limiting example.

BRIEF DESCRIPTION OF THE DRAWINGS

FIG. 8 is a view similar to the one of FIG. 4, but which relates to the distal arm of a further embodiment of the robot described herein.

DETAILED DESCRIPTION

Figure 1:
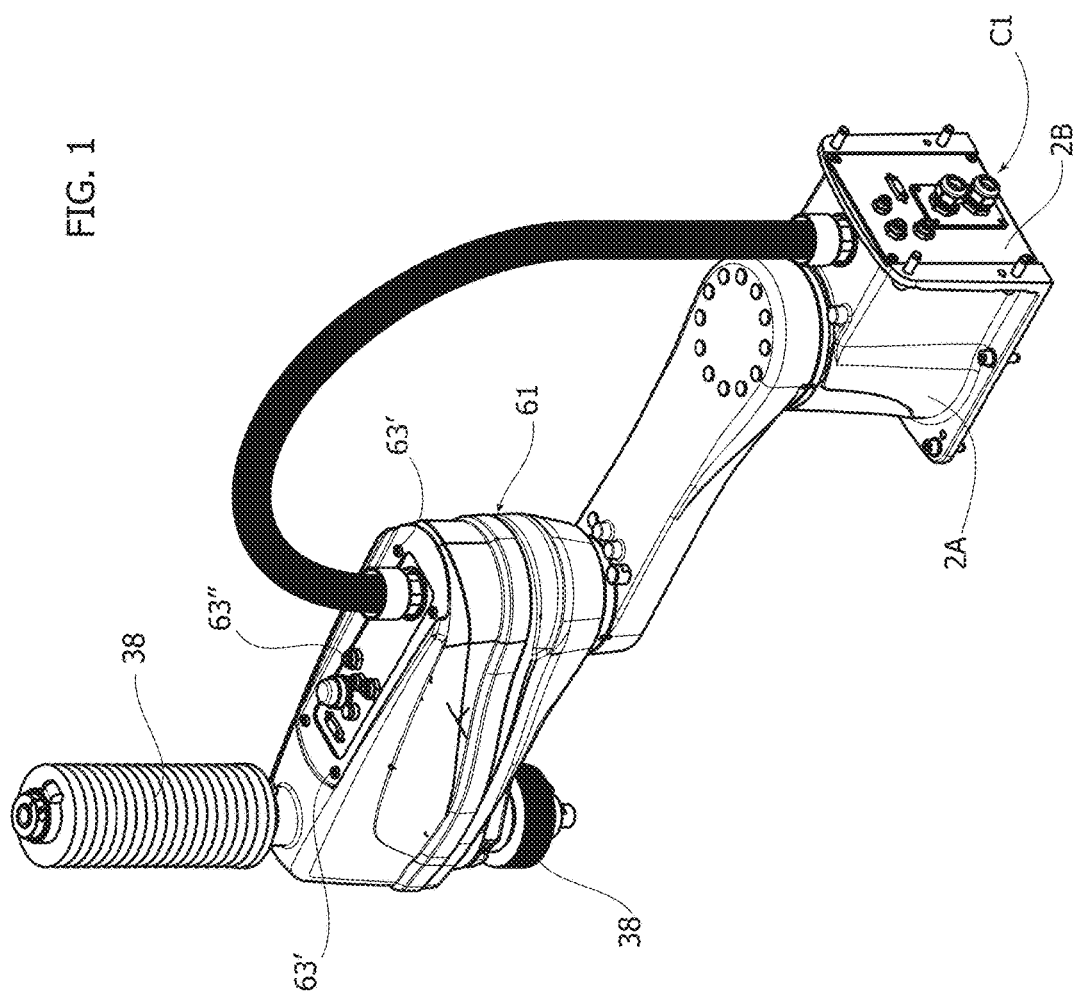
FIG. 1 illustrates, in perspective view, an embodiment of the robot described herein.
Figure 2:
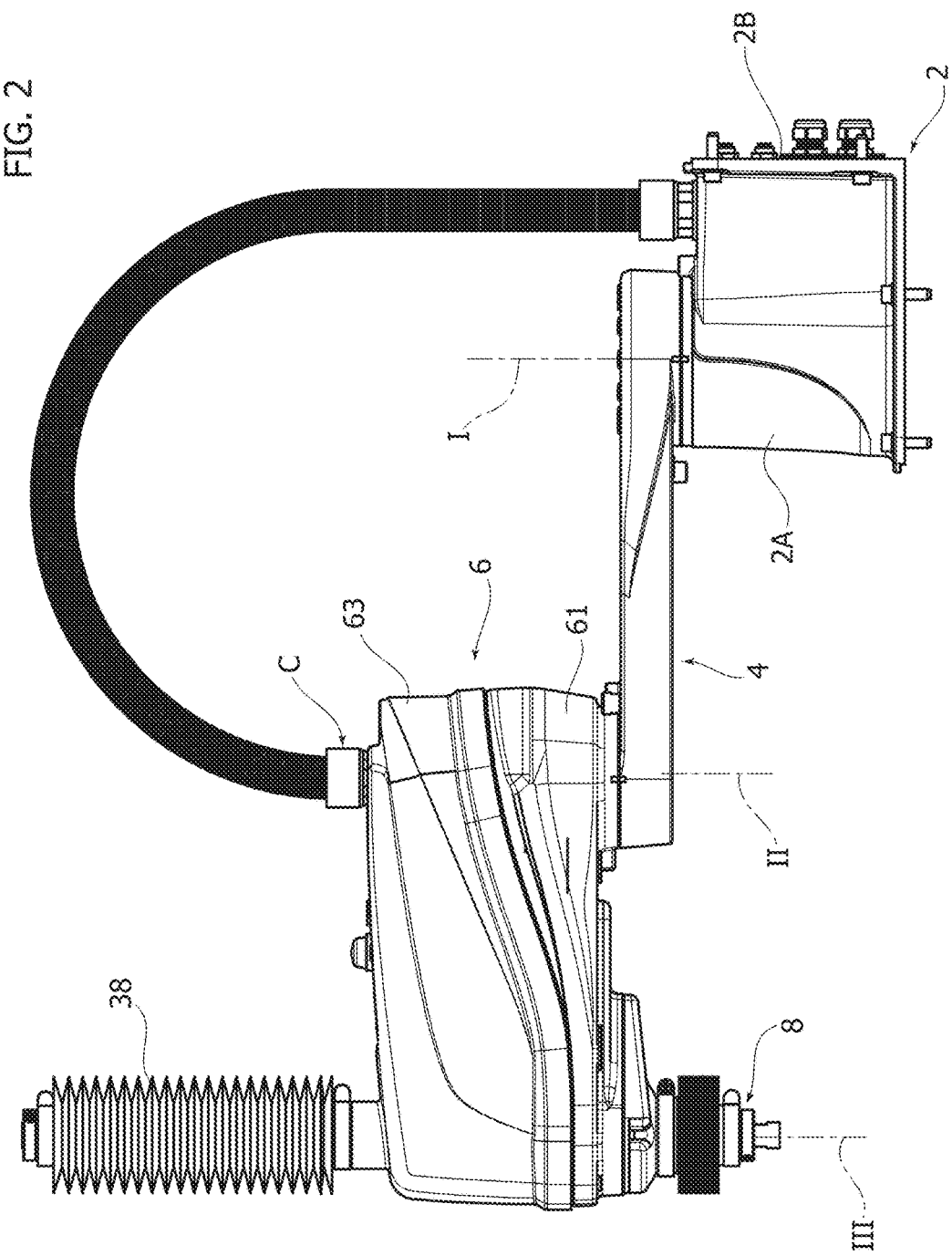
FIG. 2 illustrates a lateral view of the robot of FIG. 1.
Figure 3:
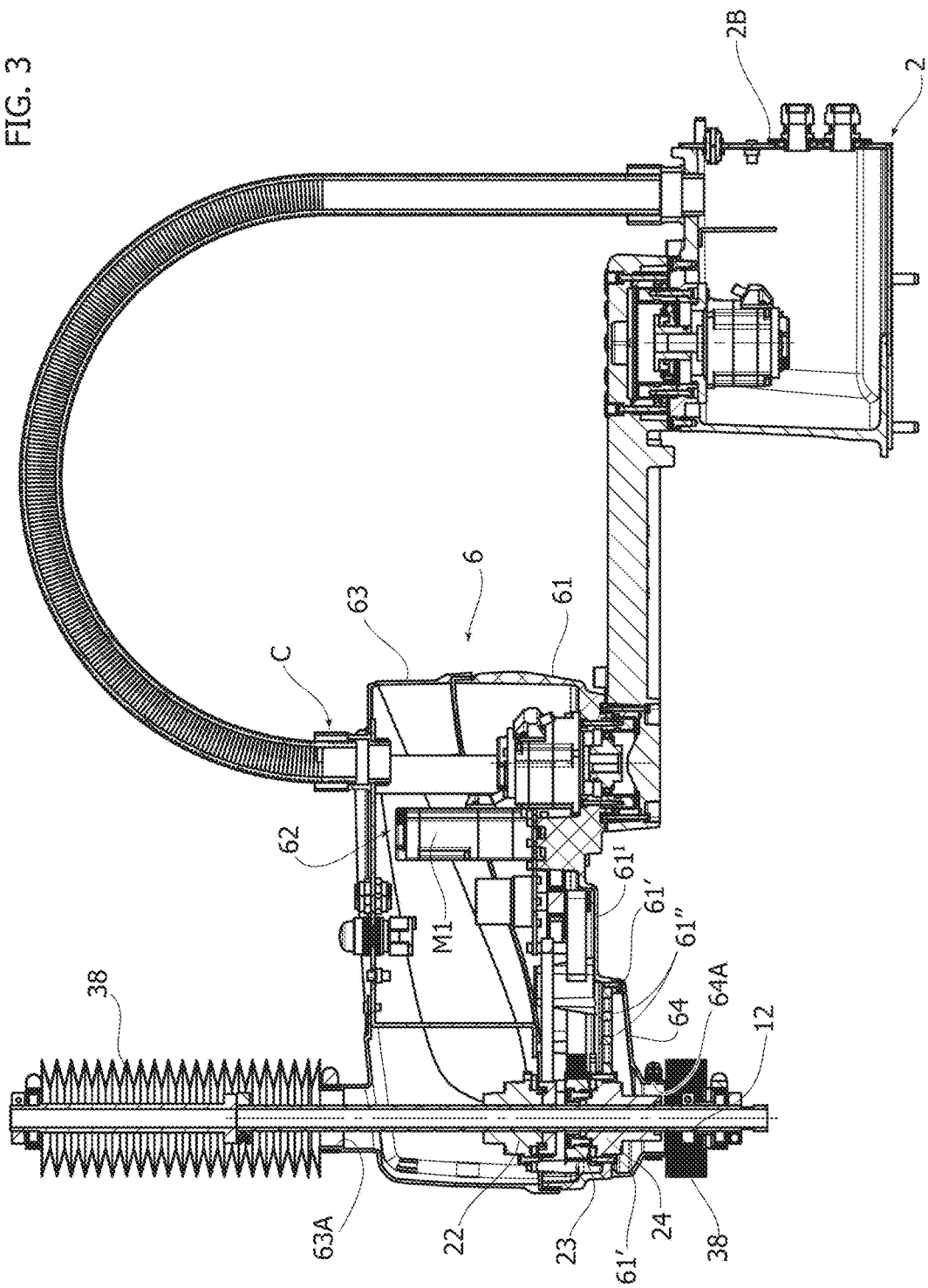
FIG. 3 is a partial cross-sectional view of the robot of FIG. 1.

Illustrated in the ensuing description are various specific details aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the scope of protection or the scope of the embodiments.

As mentioned previously, the present invention regards a multi-axis industrial robot, in particular a SCARA robot.

In general, a robot of this type comprises (the reference numbers regard the embodiment illustrated in the figures):
- a base structure 2;
- a first arm 4 pivotally connected to the base structure 2 about a first axis of rotation I;
- a second arm 6 pivotally connected to the first arm about a second axis of rotation II parallel to the aforesaid first axis; and
- an operating unit 8, carried by a shaft 12, which is mounted on the second arm 6 and can be driven by means of an actuation assembly in a first movement of translation along a third axis III and in a second movement of rotation about the same third axis.

The third axis is parallel to both of the axes I and II referred to above.

In a way in itself known in the art, the second arm 6 comprises a base body 61, fixed on which is the actuation assembly referred to, and a covering body 63, mounted on the base body and designed to constitute, together with the base body, a housing within which the actuation assembly is enclosed. In various embodiments, as in the one illustrated, the arm 6 contains within it also the motor (designated in the figures by the reference M3) for driving its rotation about the second axis II, which is mounted on the base body 61 in a conventional way.

In the robot described herein, the aforesaid second arm further comprises an intermediate body 62, via which the covering body 63 can be fixed to the base body without any need to provide for any direct fixing between these two bodies. In particular, the intermediate body 62 is prearranged for being fixed on the base body and has a structure that is configured for being set at least in part between the covering body and the actuation assembly and is provided with portions for fixing of the covering body to the intermediate body itself.

The characteristics referred to afford the advantage of providing a coupling between the base body and the covering body that is constructionally simpler than known solutions and that at the same time is characterized in that it facilitates prearrangement of a hermetic closing of the housing of the arm. In particular, these characteristics enable an arm to be provided that affords a degree of protection—also referred to as IP degree, which is defined by the CEI UNI EN60529 standard currently in force—higher than that of robots of the same type currently available on the market. As will be seen in detail in what follows, preferably the aforesaid two bodies both have a generic half-shell conformation and are connected together at their respective perimetral edges.

In various embodiments, as in the one illustrated, the base body 61 has a bottom wall 61$^I$, provided in which is an opening 61' that is traversed by the shaft 12. Moreover provided on the bottom 61$^I$ is an array of supporting formations 61$^{III}$ on which at least part of the actuation assembly for driving the shaft 12 and the intermediate body 62 referred to above are to be fixed.

The actuation assembly has, in particular, two electric motors M1, M2 and a transmission member R, each mounted on a respective plate that is fixed with screws to corresponding supporting formations 61$^{III}$ of the bottom 61$^I$. In various preferred embodiments, these formations are constituted by pins having internal threaded axial bores within which the screws for fixing the above plates are to be screwed.

The actuation assembly further comprises a first pulley (not illustrated) connected via a belt to the motor M1 and associated to a screw member 22 for transmission of motion, which engages a corresponding threaded surface provided on the shaft 12. This member 22 is supported, via interposition of bearing means, to a plate 72, which is also fixed with screws to corresponding formations 61$^{III}$ of the base body.

The assembly in question moreover comprises a second pulley 23, connected via a belt to the motor M2 by way of the transmission members R, and associated to a member 24 for transmission of the motion of rotation of the pulley 23 to the shaft 12. The member 24 engages the opening 61' made on the bottom 61$^I$ and is fixed to the latter with screws or bolts. A half-shell end cover 64 is fixed to the bottom 61$^I$ and closes the member 24 with respect to the outside environment. The end cover 64 has a bottom opening 64A that is traversed by the shaft 12. It should be noted that the arrangement of the members 22 and 24 may in any case also be reversed.

In various embodiments, as in the one illustrated, the intermediate body 62 is constituted by a metal sheet cut and bent so as to define a raised wall 62$^I$, which is located over the electric motors M1, M2, M3 and the transmission members R, and a series of flaps 62$^{II}$ bent substantially at 90° with respect to the aforesaid wall, which are fixed to respective formations 61$^{III}$ of the bottom 61$^I$. As will be seen in what follows, the front flap 62$^{II}$ that is set facing the shaft 12 may constitute a wall for separation of the inside of the covering body 63.

Positioned on the raised wall 62$^I$ are appropriate elements T for signalling purposes and for controlling the robot (such as warning lights, pushbuttons, etc.), and a connector C for connection of the equipment of the robot to the arm 6 described herein. The equipment is represented by a bundle of tubes and/or electrical cables that connects the base structure 2 to the arm 6.

The aforementioned wall 62$^I$ moreover has appropriate holes 62' positioned so as to mate with corresponding holes 63' made on the top wall of the covering body 63, to enable mutual fixing of said body to the intermediate body 62 with screws. In various preferred embodiments, as in the one illustrated, the covering body 63 has a top opening 63" that is designed to be positioned on the wall 62$^I$ in such a way that the series of warning lights, buttons, and connectors referred to above emerge on the outside. In a way in itself known, the body 63 moreover has a top opening 63A that is traversed by the shaft 12.

As anticipated above, in various preferred embodiments, as in the one illustrated, in the robot described herein the housing of the arm 6 is closed hermetically both in order to prevent exit of contaminating material in the working area and in order to enable its use in applications in which the arm or robot in general may also be exposed to the presence of liquids.

To obtain hermetic sealing of the arm, an annular gasket 32 is set between the respective mouth edges coupled together of the covering body 63 and of the base body 61, and extends all around the mouth edge of the base body. In various preferred embodiments, as in the one illustrated, the base body 61 has, up against its mouth edge, a contrast edge 61$^{II}$ against which the gasket 32 is positioned. Once again at the mouth edge of the body 61, the side walls of the body are moreover slightly tapered to facilitate insertion of the mouth edge into the complementary mouth edge of the covering body 63.

A second annular gasket 34 is moreover set between the raised wall 62$^I$ of the intermediate body 62 and the inner surface of the covering body 63 that delimits the opening 63". This gasket rests on the raised wall 62I and surrounds the series of connectors, pushbuttons, warning lights, etc., that emerge directly on the outside of the arm. A further gasket 36 is set between the end cover 64 and the bottom 61$^I$ of the base body.

In various embodiments, as in the one illustrated, the arm 6 may moreover envisage a top bellows and a bottom bellows, which are both designated by the reference number 38. The top bellows is constrained, at one end, to the top wall of the covering body 63 and, at its opposite end, to the end of the shaft 12 that comes out of this wall, whereas the bottom bellows is constrained, at one end, to the end cover 64 and, at its opposite end, to the end of the shaft 12 that comes out of the end cover 64 itself. The inside of both bellows is set in communication with the inside of the covering body 63, in particular through the top opening 63A of the body 63, in the case of the top bellows, and through the bottom opening 64A of the end cover 64, in the case of the bottom bellows. The bottom wall 61 of the base body 61 has openings 61" designed to set in communication the inside of the covering body 63 with the inside of the end cover 64. The ends of the bellows are coupled, via interposition of gaskets, to the respective elements to which they are constrained.

Figure 6:
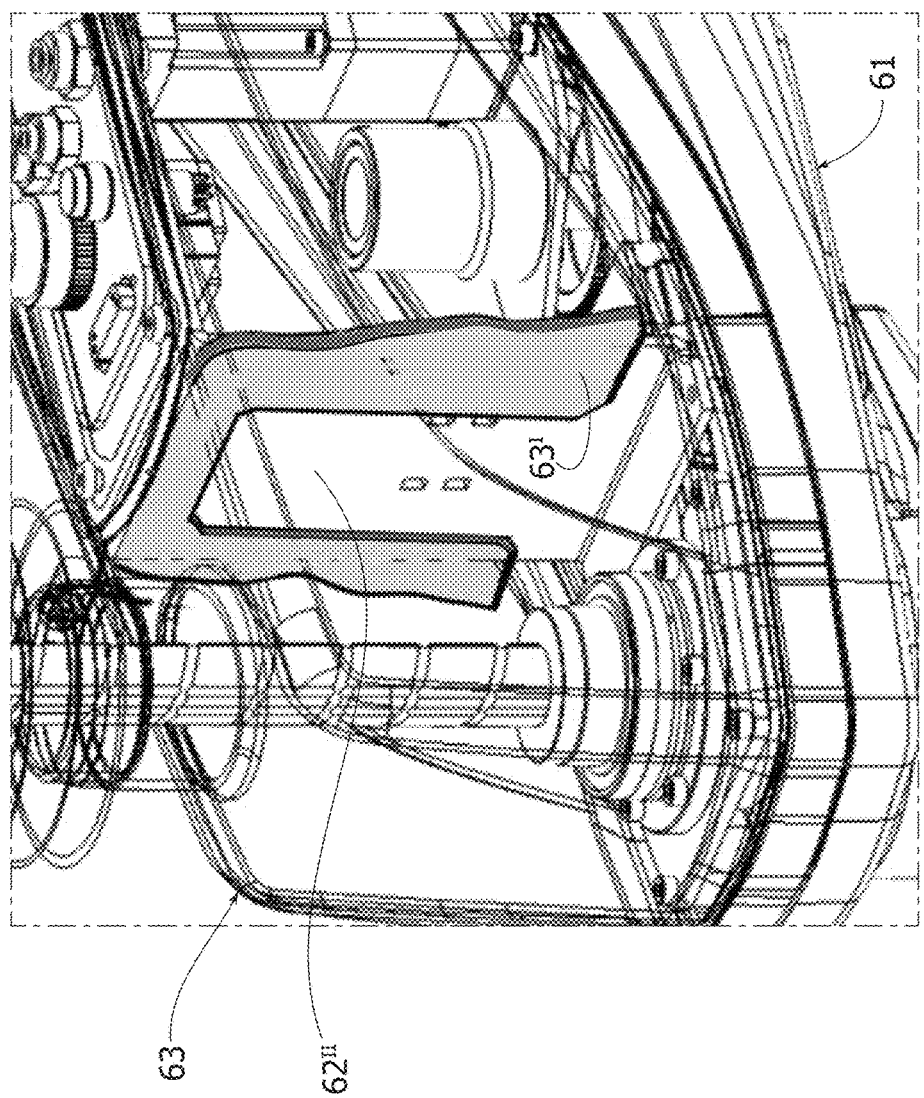
FIG. 6 is a perspective view of a detail of the distal arm of the robot of FIG. 1.
Figure 7:
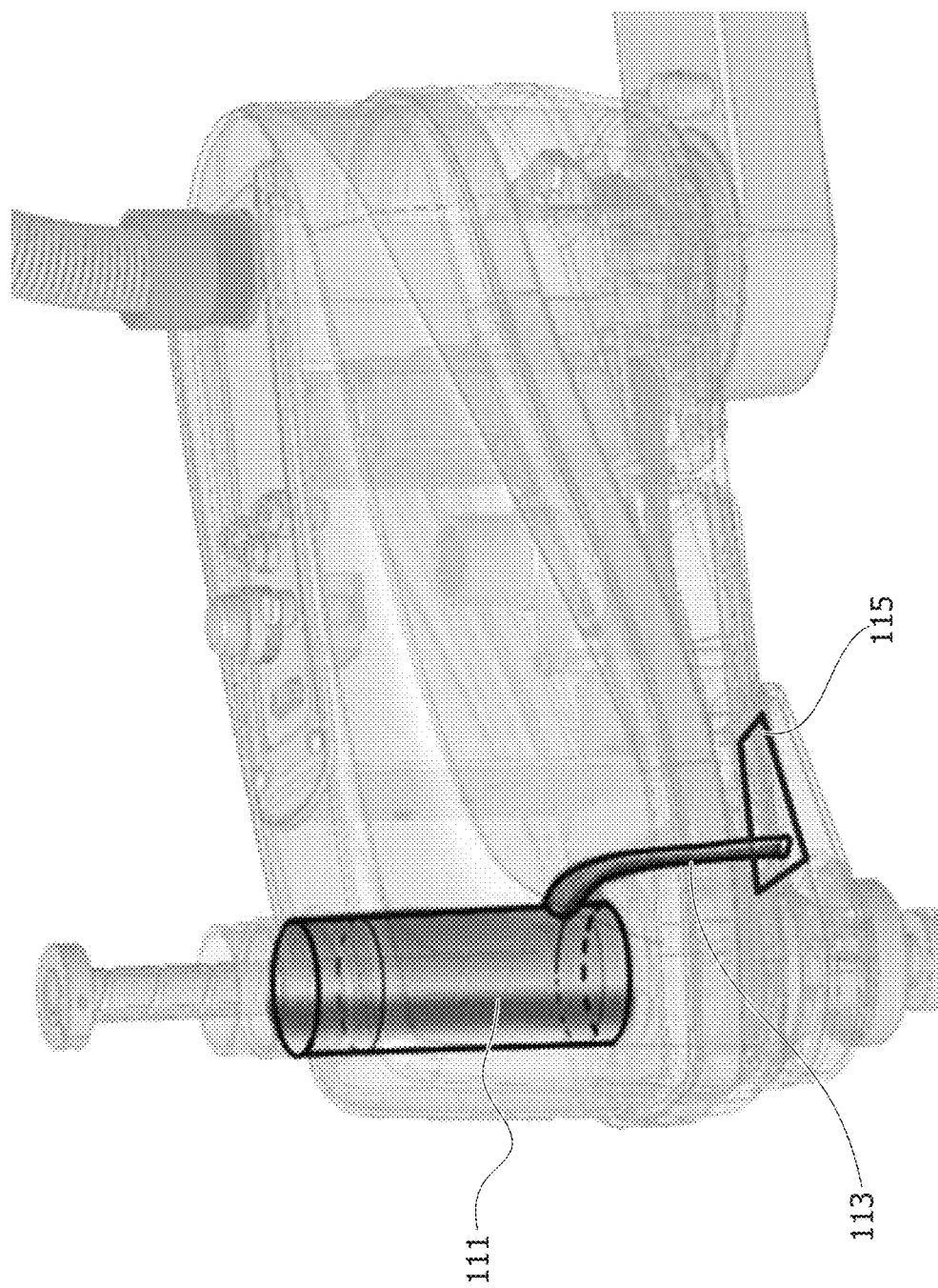
FIG. 7 is a perspective view of a further detail of the distal arm of the robot of FIG. 1.

In the light of the foregoing, it will be appreciated that the configuration of the arm 6 thus devised guarantees perfect hermetic closing thereof. In addition, in various embodiments, as in the one illustrated (see in this connection FIG. 6), the covering body 63 has inside one or more partition walls 631, which are oriented in a direction transverse to the opposite side walls of the covering, and that are designed to overlap partially the front flap 62II of the intermediate body 62 so as to co-operate with this in order to separate the chamber containing the actuation motors from the chamber containing the shaft 12 and the corresponding transmission members 22 and 24. This separation guarantees effective protection of the motors, above all in the cases where the bellows 38 referred to above are absent.

Once again with reference to the configurations of the robot without bellows, within the covering body 63 a tube 111 made of plastic material, for example PET, may be provided, which can be mounted by being slotted into the top opening 63A of the body 63, for example, by engaging the opening with one end thereof and the cylindrical portion of the member 22, with its opposite end, and which has the function of collecting any water that might infiltrate through the gaps present between the opening 63A and the shaft 12. The tube in question has the bottom closed and is provided with a small draining tube 113 that has the function of draining off the water to the outside, from the bottom side of the arm. In particular, the draining tube 113 is set above one of the openings 61" made in the bottom $61^I$ for discharging the water into the end cover 64, from which it will then flow out by gravity, through the opening 64A of said end cover. In various embodiments, in the configuration without bellows, provided at the openings 61" is a patch 115 having the function of closing the openings except for the one onto which the end of the draining tube 113 gives out. This patch has the function of preventing infiltration of material, for example, water, into the covering body 63 through the aforesaid openings.

In various preferred embodiments, also the other parts of the robot described herein can be appropriately prearranged for use of the robot in the particular applications referred to above.

In this connection, in various preferred embodiments, as in the one illustrated, the first arm 4, which is usually made of metal material and envisages a bottom structure provided with reinforcement ribbings, has a covering plate (not illustrated) applied on the bottom side of the arm and defining on this side a completely smooth surface in order to prevent any deposit of dirt.

Moreover, in various preferred embodiments, as in the one illustrated, also the base structure 2 of the robot, which contains the motor for actuating the first arm and the terminal portions of the equipment of the robot, may be hermetically closed. In particular, the structure 2 in question comprises, in a way in itself known, a hollow main body 2A, obtained by moulding of molten metal material, housed within which are the aforesaid motor and the terminal portions of the equipment. In these preferred embodiments, the body is closed by the plates 2B, via interposition of purposely provided gaskets 44. Positioned on one of the plates 2B are a series of connectors or ports C1 for connection of the equipment to external power supplies.

Finally, the robot described herein may moreover be equipped with further gaskets 46, 48 at the portions of mutual coupling of the arms 4 and 6 and of the base structure 2.

It should, in general, be noted that the robot described herein may be provided with appropriate gaskets also in all those parts or elements fixed to the structure of the robot, for example the connector member C, the pushbuttons or warning lights T, the connectors C1, etc., where small slits or gaps could form that would allow passage of air.

Figure 4:
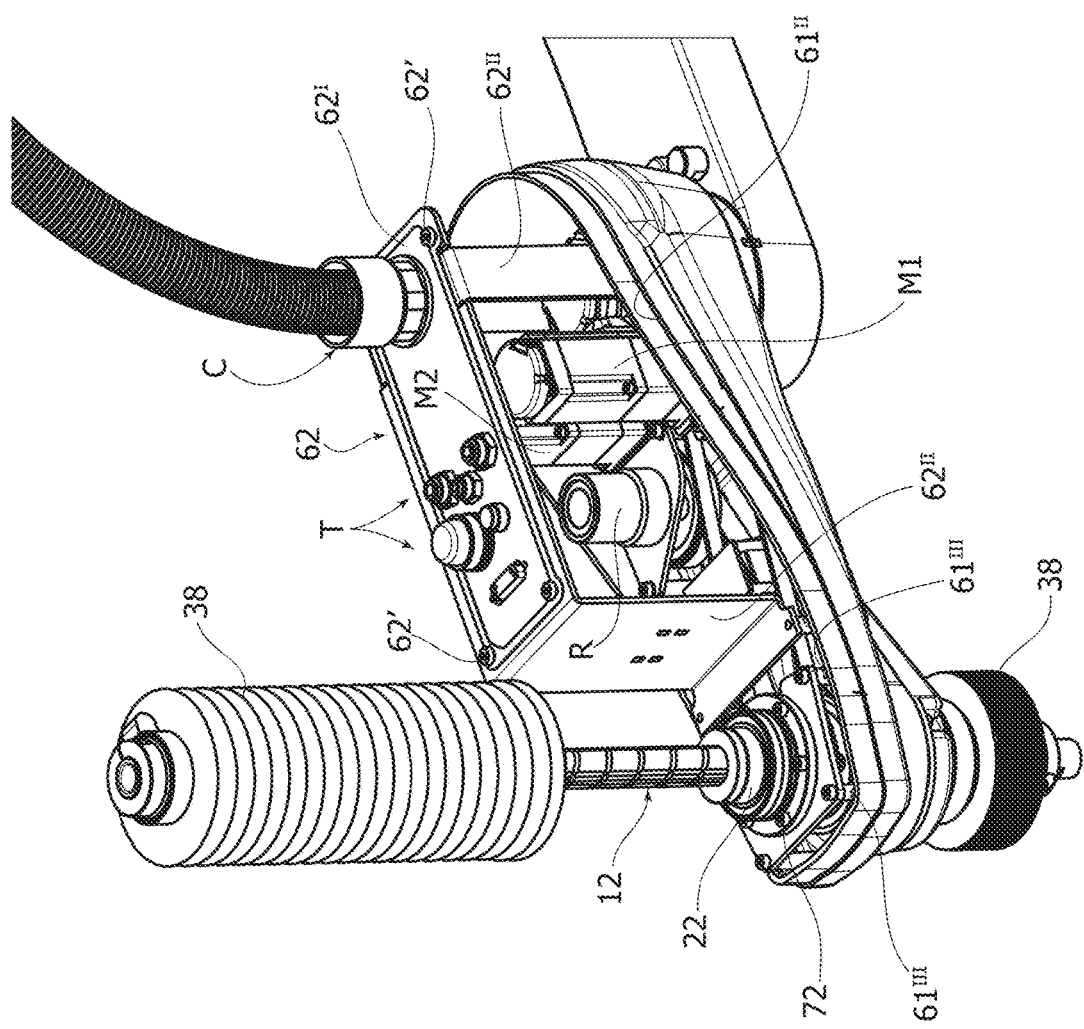
FIG. 4 is a detailed view of the distal arm of the robot of FIG. 1, in which the covering body of said arm has been removed.
Figure 5:
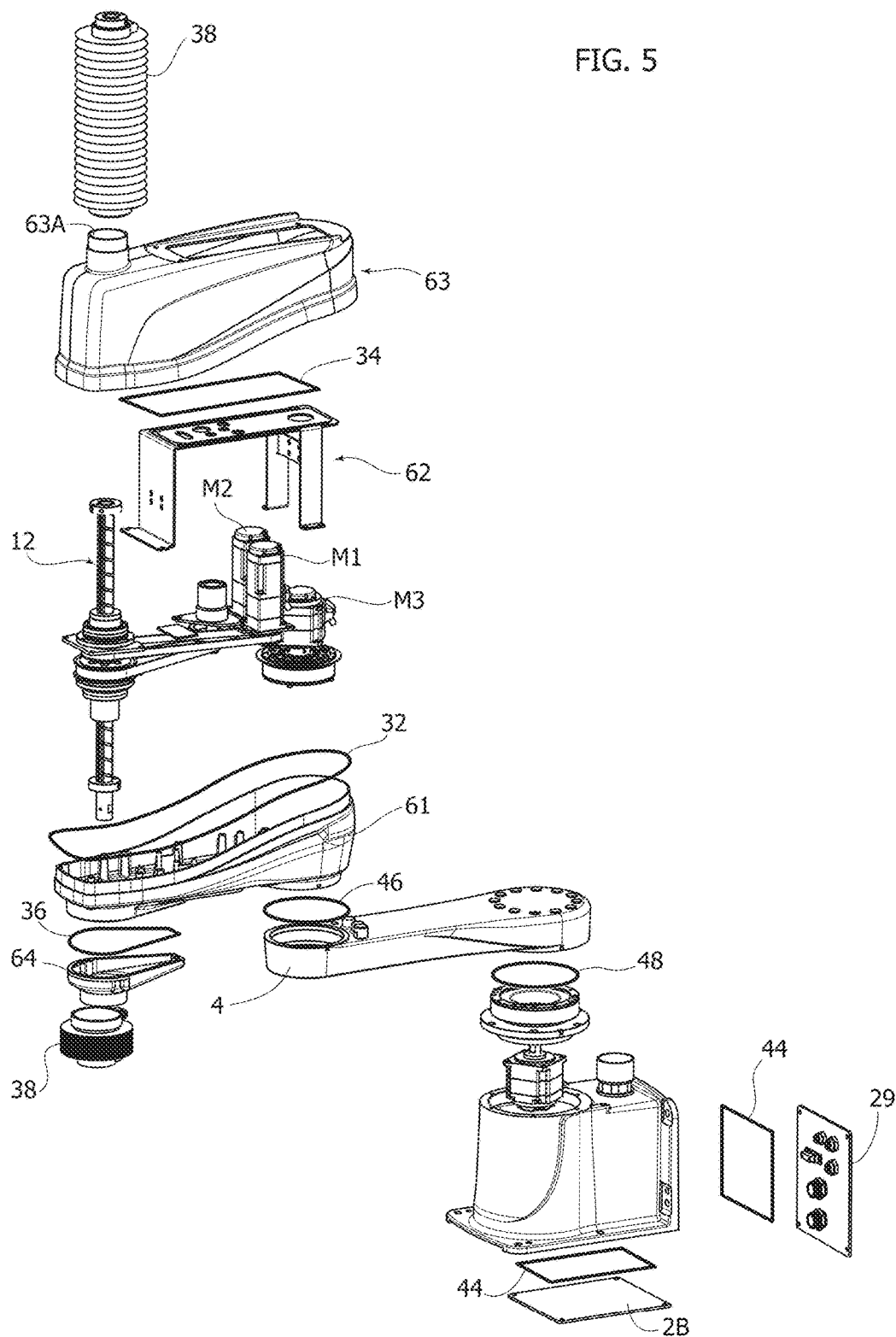
FIG. 5 is an exploded view of the robot of FIG. 1.

Referring to FIG. 8, it should be noted that in various alternative embodiments, as in the one illustrated in this figure, the intermediate body 62 is not made in one single piece but instead it has a raised portion—indicated with the reference number 62IV—which is provided with a frame configuration innerly defining an aperture (not visible in the figure), and to which, through means of removable connection, such as screws, is connected a plate or wall 65 having the same function of the raised wall 62IV of the embodiment of FIG. 4. On said plate are in fact positioned the same elements T and the connector C described above. The cited inner aperture lets the various elements carried by plate 65 face and access the inside of arm 6.

The raised portion $62^{IV}$ has, furthermore, the same holes 62' described above with reference to FIG. 4, which are positioned so as to mate with the holes 63' made on the top wall of the covering body 63, to enable mutual fixing of said body to the intermediate body 62 with screws. On the other hand, it should be noted that the top opening 63" of the covering body is designed to be positioned on the raised portion $62^{IV}$ in such a way that the series of warning lights, buttons, and connectors carried by plate 65 emerge on the outside and, furthermore, in such a way that the perimetral edges of the top opening surround the plate 65, so that the latter can be removed from the raised portion $62^{IV}$ without any need to first remove the covering body 63. The gasket 34 described above (not visible in FIG. 8) is set between the raised portion $62^{IV}$ and the inner surface of the covering body 63 that delimits the opening 63". Of course, without prejudice to the principle of the invention, the details of construction and the embodiments may vary even significantly with respect to what has been illustrated herein purely by way of non-limiting example, without thereby departing from the scope of the invention, as is defined in the annexed claims.

What is claimed is:

1. A multi-axis industrial robot, in particular of a SCARA type, comprising:
   a base structure;
   a first arm pivotally connected to the base structure about a first axis of rotation;
   a second arm pivotally connected to said first arm about a second axis of rotation parallel to said first axis of rotation; and
   an operating unit carried by a shaft, which is mounted on said second arm and can be driven, by means of an actuation assembly, in a first movement of translation along a third axis and in a second movement of rotation about said third axis, said third axis being parallel to said first and second axes of rotation,
   wherein said second arm comprises:
   a base body fixed on which is said actuation assembly; and
   a covering body, which is mounted on said base body,
   wherein said base body and said covering body constitute a housing within which said actuation assembly is enclosed and separated from the external environment;
   said robot being characterized in that said second arm comprises an intermediate body, which is fixed on said base body and has a structure that is set at least in part between said covering body and said actuation assembly and is provided with portions for fixing said covering body on said intermediate body in such a way that said covering body is fixed on said base body through said intermediate body and constitutes, together with said base body, the housing within which said actuation assembly and said intermediate body are enclosed,
   wherein said intermediate body further defines a wall, which is set between said covering body and said actuation assembly and is provided with said fixing portions;
   wherein carried on said wall are at least one connector member for connection of a bundle of cables and/or tubes and means for signalling purposes and/or for controlling said robot;
   wherein said covering body has an opening, which is set in a position corresponding to said wall in such a way that said connector member and/or said signalling and/or control means will emerge on the outside of said second arm;

wherein a first seal element having an annular shape is set between said wall and internal portions of said covering body that extend around said opening so that said fixing portions and said connector member and/or said signalling and/or control means are positioned in a region on the inside of said first seal element: and wherein a second seal element is set between said base body and said covering body.

2. The robot according to claim 1, wherein said intermediate body is constituted by a metal sheet cut and bent so as to define said wall and respective flaps, which are bent in a direction transverse to said wall and are fixed to said base body.

3. The robot according to claim 1, wherein said intermediate body comprises a metal sheet cut and bent so as to define a frame portion and respective flaps which are bent in a direction transverse to said portion and are fixed to said base body, and wherein said intermediate body further comprises a plate removably connected to said frame portion and defining said wall carrying said connector member and/or said signalling and/or controlling means, and wherein said opening of said covering body is dimensioned so as to surround with its own perimetral edges said plate, in such a way that said plate can be removed from said frame portion without any need to first remove said covering body.

4. The robot according to claim 1 wherein said base body has a bottom wall provided on which is an array of supporting formations, raised with respect to the surface of said bottom wall, on which said actuation assembly, or part of said actuation assembly, and said intermediate body are fixed.

5. The robot according to claim 4, wherein said formations are constituted by pins having threaded axial bores.

6. The robot according to claim 4, wherein said actuation assembly comprises a first electric motor, a second electric motor, and at least one member for transmission of motion from said motors to said shaft, each of the first and second electric motors are carried on respective plates fixed to corresponding supporting formations of said array of supporting formations provided on said bottom wall.

7. The robot according to claim 1, wherein said second arm comprises:
a first bellows associated, at one end, to a top wall of said covering body and, at its opposite end, to an end of said shaft that comes out of said covering body; and
a second bellows associated, at one end, to a bottom wall of said base body or to an end cover fixed to said bottom wall and, at its opposite end, to an end of said shaft that comes out of said bottom wall or said end cover.

8. The robot according to claim 1, wherein said covering body has on an inside one or more walls designed to co-operate with said intermediate body so as to divide the inside of said covering body into a first chamber and a second chamber, which are separated from one another and contain, respectively, said shaft and a first and a second electric motor for driving said shaft.

9. The robot according to claim 8, wherein said intermediate body has a front flap or wall, which faces said shaft, and wherein said internal walls of said covering body are configured for co-operating with said front wall of said intermediate body.

10. A multi-axis industrial robot, in particular of a SCARA type, comprising:
a base structure;
a first arm pivotally connected to the base structure about a first axis of rotation;
a second arm pivotally connected to said first arm about a second axis of rotation parallel to said first axis of rotation; and
an operating unit carried by a shaft, which is mounted on said second arm and can be driven, by means of an actuation assembly, in a first movement of translation along a third axis and in a second movement of rotation about said third axis, said third axis being parallel to said first and second axes of rotation,
wherein said second arm comprises:
a base body fixed on which is said actuation assembly;
a covering body, which is mounted on said base body;
a first bellows associated, at one end, to a top wall of said covering body and, at its opposite end, to an end of said shaft that comes out of said covering body; and
a second bellows associated, at one end, to a bottom wall of said base body or to an end cover fixed to said bottom wall and, at its opposite end, to an end of said shaft that comes out of said bottom wall or said end cover,
wherein said base body and said covering body constitute a housing within which said actuation assembly is enclosed and separated from the external environment;
said robot being characterized in that said second arm comprises an intermediate body, which is fixed on said base body and has a structure that is set at least in part between said covering body and said actuation assembly and is provided with portions for fixing said covering body on said intermediate body in such a way that said covering body is fixed on said base body through said intermediate body and constitutes, together with said base body, the housing within which said actuation assembly and said intermediate body are enclosed.

* * * * *